Patented Sept. 8, 1942

2,294,944

UNITED STATES PATENT OFFICE 2,294,944

PRINTING PLATE PREPARATION

William H. Wood, Bedford, Ohio, assignor to Harris-Seybold-Potter Company, Cleveland, Ohio, a corporation of Ohio No Drawing. Application January 8, 1941,
Serial No. 373,627

12 Claims. (Cl. 101—149)

Gum arabic has been employed very extensively in lithographic printing, notwithstanding certain well recognized drawbacks which have limited its usefulness. Thus, customarily a "de-sensitizing etch" is applied in preparing lithographic plates for the press, such etch being a solution of gum arabic and ammonium bichromate and phosphoric acid. This renders the non-printing areas receptive to moisture as supplied during the printing, and correspondingly repellent to the greasy ink. The dampening solution applied during printing is somewhat similar to the de-sensitizing solution but is less concentrated. Gum arabic in solution is customarily also applied to a plate which is idle on the press or is removed for storage. Fundamentally, gum arabic dissolves slowly in water. It must be applied also in considerable quantities during printing in order to maintain the non-printing areas sufficiently de-sensitized to ink. Such amounts of gum arabic solution tend to emulsify the ink, causing weak printing, scum-formation on the plate, and stripping of the ink from the ink rollers. Such tendencies are due to the inherent nature of gum arabic, it being an effective emulsifying agent. It is also undesirably acid in character and tends to corrode printing plates coated with it and remaining some time in storage. With the present invention, drawbacks such as noted relative to gum arabic may be obviated, and with particularly convenient means.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

I have found that lithographic plates, as of usual or preferred materials, zinc, aluminum, etc., may be treated particularly effectively by materials as set forth in detail below. Thus, in treating a plate for rendering the non-printing areas repellent to ink by a "de-sensitizing etch" before printing, this, in accordance with the invention, involves a moderately concentrated solution of mesquite gum, and one or more of a de-sensitizing acid or salt, as for instance acids or salts providing a chromate ion, as chromic acid, ammonium, sodium or potassium bichromate, etc., or acids or salts providing a phosphate ion, as phosphoric acid, or ammonium, sodium or potassium phosphate, or other suitable acids or salts. Mesquite gum is a dried exudation product obtained in the form of brown transparent glassy solid masses which are easily friable, from mesquite trees in the southwestern portion of the United States and in Mexico. Botanically, at least one or two species are generally regarded as special producers, such as Prosopis juliflora, and others analogous. Mesquite gum dissolves in water more quickly than gum arabic and is appreciably more soluble and has also lower viscosity than gum arabic solutions of similar concentrations. In de-sensitizing usage it is merely necessary that the solution be such as to be readily applied and that the effect be sufficient to produce the desired de-sensitizing result, the concentration not being critical. Mesquite gum is more nearly neutral than gum arabic solution. For dampening the plate during printing, the same kind of solution as noted may be employed but more dilute, as appropriate for continued application to the plate. For protecting plates during idle periods or storage a solution of easy-working concentration sufficient to form a continuous coating of dried gum on the plate is employed. A small amount of preservative, as for instance mercury bichloride, may be included in the solution for better keeping.

As an example: For de-sensitizing a plate before printing, a solution is made up from eight ounces of a 20 per cent stock solution of mesquite gum, and one-half ounce of phosphoric acid is incorporated. A second solution is made up of one ounce of ammonium bichromate to eight ounces of water. Equal parts of these two solutions are mixed together for the desensitizer for applying to the plate.

As a further example: For use in dampening during printing, one ounce of each of the above solutions is made up with two gallons of water, and is supplied to the water fount.

As a further example: For protective coating of plates after printing, mesquite gum about twenty parts by weight is made up with about 100 parts by weight of water, and this solution is coated on the plate.

As another example: As a dry preparation, particularly convenient for stock and handling in the trade and where it is desired to make only small amounts of solutions as required for use, 100 parts by weight of dry mesquite gum and 29 parts of ammonium bichromate and 43.5 parts of monobasic ammonium phosphate are mixed together. When this is dissolved in 1,000 parts of water, it forms a solution of substantially the same concentration of ingredients as the solution in the first example given above. For use in dampening during printing, this solution may be diluted further with water at the rate of two ounces of the solution to two gallons of water, or as in the second example above. Amounts for protective coating, are also as indicated.

As noted, the concentrations are not especially critical, and while concentrations of mesquite gum of about 10 per cent are generally satisfactory for de-sensitizing, and about 0.1 per cent for dampening, the concentration may be varied in accordance with particular results desired, and the mode of applying the solution.

Whereas with customary gum arabic solutions there is a tendency to emulsification and scumming and stripping in the operation of printing, these difficulties become of little importance with the materials employed in the present invention, and very much less dampening fluid is required, there being better wetting action on the plate surface. Corrosion of plates in storage is also eliminated.

Other modes of applying the principle of the invention may be employed, change being made as regards the details described, provided the features stated in any of the following claims, or the equivalent of such, be employed.

I therefore particularly point out and distinctly claim as my invention:

1. In the treatment of lithographic printing plates after formation of the printing image, before printing applying to the non-image areas of the plate an aqueous solution of mesquite gum with smaller amounts of a soluble bichromate and phosphoric acid.

2. In the treatment of lithographic printing plates after formation of the printing image, applying to the plate an aqueous solution of mesquite gum and a substance providing a chromate ion and a substance providing a phosphate ion.

3. In the treatment of lithographic printing plates after formation of the printing image, applying to the plate an aqueous solution of mesquite gum and a substance providing in solution a chromate ion.

4. In the treatment of lithographic printing plates after formation of the printing image, applying to the plate an aqueous solution of mesquite gum and material providing a plate de-sensitizing acid ion.

5. In the treatment of lithographic printing plates, during printing applying to the plate a dilute solution of mesquite gum and a substance providing a plate de-sensitizing acid radical.

6. In the treatment of lithographic printing plates bearing a printing image, protecting the surface of the plate by providing a thin coating of mesquite gum thereon.

7. A lithographic plate bearing a printing image and having a thin coating of mesquite gum.

8. A lithographic plate treating agent providing mesquite gum.

9. A lithographic plate treating solution comprising mesquite gum and a substance providing a plate de-sensitizing acid radical, and water.

10. A lithographic plate treating agent comprising in dry form mesquite gum and a de-sensitizing material.

11. A lithographic plate treating agent comprising in dry form mesquite gum and a phosphate ion providing material.

12. A lithographic plate treating agent comprising in dry form mesquite gum and a chromate and a phosphate.

WILLIAM H. WOOD.